United States Patent
Tankov et al.

(10) Patent No.: US 9,582,313 B2
(45) Date of Patent: Feb. 28, 2017

(54) CONNECTION RESOURCE SYSTEM

(75) Inventors: Nikolai D. Tankov, Sofia (BG); Peter K. Matov, Velingrad (BG); Harald Mueller, Boeblingen (DE); Samir A. Zeort, Walldorf (DE); Svetoslav H. Manolov, Sofia (BG)

(73) Assignee: SAP SE, Walldorf (DE)

( * ) Notice: Subject to any disclaimer, the term of this patent is extended or adjusted under 35 U.S.C. 154(b) by 1674 days.

(21) Appl. No.: 10/861,267

(22) Filed: Jun. 3, 2004

(65) Prior Publication Data

US 2006/0031388 A1 Feb. 9, 2006

(51) Int. Cl.
| | |
|---|---|
| *G06F 15/16* | (2006.01) |
| *G06F 9/46* | (2006.01) |
| *G06F 9/50* | (2006.01) |
| *H04L 29/06* | (2006.01) |

(52) U.S. Cl.
CPC ............ *G06F 9/466* (2013.01); *G06F 9/5055* (2013.01); *H04L 69/14* (2013.01)

(58) Field of Classification Search
CPC ..................................................... H04L 69/14
USPC .......... 709/217, 219, 203, 227; 710/1; 705/1
See application file for complete search history.

(56) References Cited

U.S. PATENT DOCUMENTS

| | | | |
|---|---|---|---|
| 5,790,789 A | 8/1998 | Suarez | |
| 6,125,382 A * | 9/2000 | Brobst et al. | 718/102 |
| 6,233,585 B1 | 5/2001 | Gupta et al. | |
| 6,260,057 B1 | 7/2001 | Eykholt et al. | |
| 6,721,777 B1 | 4/2004 | Sharma | |
| 6,832,238 B1 * | 12/2004 | Sharma et al. | 709/201 |
| 6,886,041 B2 | 4/2005 | Messinger et al. | |
| 6,976,061 B1 * | 12/2005 | Sharma | 709/220 |
| 7,007,075 B1 * | 2/2006 | Coffey | 709/219 |
| 7,036,110 B2 | 4/2006 | Jeyaraman | |
| 7,080,119 B2 | 7/2006 | Felt et al. | |
| 7,089,317 B2 * | 8/2006 | Jeyaraman et al. | 709/230 |
| 2002/0144002 A1 | 10/2002 | Matena et al. | |
| 2003/0074217 A1 | 4/2003 | Beisiegel et al. | |
| 2003/0093402 A1 | 5/2003 | Upton et al. | |
| 2003/0145074 A1 | 7/2003 | Penick | |
| 2003/0182426 A1 | 9/2003 | Hapner et al. | |
| 2003/0191803 A1 | 10/2003 | Chinnici et al. | |
| 2003/0204740 A1 * | 10/2003 | Shapiro et al. | 713/200 |
| 2003/0221021 A1 * | 11/2003 | Kan et al. | 709/315 |
| 2003/0229888 A1 | 12/2003 | Spotwood et al. | |

(Continued)

OTHER PUBLICATIONS

Applicant Admitted Prior Art back ground invention par 0002-0004.*

(Continued)

*Primary Examiner* — Karen Tang
(74) *Attorney, Agent, or Firm* — Schwegman Lundberg & Woessner, P.A.

(57) ABSTRACT

A system and method for a connection resource system is disclosed. According to an embodiment of the invention, a method includes establishing a first connection, the first connection being between one of one or more server applications and one of one or more external resources; and establishing a second connection, the second connection being between one of the one or more server applications and one of the one or more external resources; wherein the first connection and the second connection are established utilizing a single resource system.

22 Claims, 7 Drawing Sheets

(56) References Cited

U.S. PATENT DOCUMENTS

| | | | |
|---|---|---|---|
| 2003/0236923 A1 | 12/2003 | Jeyaraman et al. | |
| 2004/0015859 A1 | 1/2004 | Potter et al. | |
| 2004/0015974 A1 | 1/2004 | Jeyaraman | |
| 2004/0078495 A1* | 4/2004 | Mousseau et al. | 710/1 |
| 2004/0098726 A1* | 5/2004 | Currie et al. | 719/310 |
| 2004/0109413 A1* | 6/2004 | Hierholzer et al. | 370/230 |
| 2004/0172639 A1 | 9/2004 | Lou et al. | |
| 2004/0215473 A1* | 10/2004 | Bhogi et al. | 705/1 |
| 2005/0265315 A1* | 12/2005 | Edgar | 370/352 |
| 2006/0041662 A1* | 2/2006 | Georgiev et al. | 709/226 |
| 2006/0075115 A1 | 4/2006 | Chitilian et al. | |
| 2010/0275210 A1* | 10/2010 | Phillips et al. | 718/102 |

OTHER PUBLICATIONS

"OA mailed Sep. 13, 2007 for U.S. Appl. No. 10/858,661".

"OA mailed Dec. 14, 2007 for U.S. Appl. No. 10/863,159".

Demichiel, Linda, et al., "JSR 220: Enterprise JavaBeansTM,Version 3.0, EJB Core Contracts and Requirements", *Sun Microsystems, EJB 3.0 Expert Group*, (May 2, 2006), Whole Document.

Demichiel, Linda, et al., "JSR 220: Enterprise JavaBeansTM,Version 3.0, Java Persistence API", *Sun Microsystems, EJB 3.0 Expert Group*, (May 2, 2006), Whole Document.

Shannon, Bill, "JavaA 2 Platform, Enterprise Edition Specification, v1.4", *Sun Microsystems*, (Nov. 24, 2003), Whole Document.

USPTO, "FOA Mailed Oct. 27, 2008 for U.S. Appl. No. 10/860,839", (Oct. 27, 2008), Whole Document.

USPTO, "OA Mailed Sep. 18, 2008 for U.S. Appl. No. 10/858,661", (Sep. 18, 2008), Whole Document.

Final Office Action for U.S. Appl. No. 10/858,657, Mailed Feb. 26, 2009, 19 pages.

Sun Microsystems, "Sun Trademarks", http://www.sun.com/suntrademarks/, (Printed / Downloaded Jan. 15, 2009), 1-6.

* cited by examiner

CONNECTION RESOURCE SYSTEM

TECHNICAL FIELD

Embodiments of the invention generally relate to the field of client/server systems and, more particularly, to a system and method for a connection resource system.

BACKGROUND

A server may include multiple server applications. The applications may be comprised of program components of varying types and existing in different containers, each container providing life cycle management, security, deployment, and runtime services for the components. Each of such applications may in turn require connections with various external resources, with the resources being connected to the servers using varying connectors.

The connections of the applications and the external resources may be complex. Generally it is necessary that each connection between an application and a resource be negotiated and handled separately. Each of the relationships between an application and an external resource may require a separate resource manager for the establishment of the communications contract for the relationship.

Therefore, the establishment and elimination of connections for a server may be complex when multiple applications and resources are involved. Further, the separate negotiation and establishment of communications contracts may mean that possible sharing of resources among components is not addressed and that processes for enlisting and delisting resources are not handled efficiently.

SUMMARY OF THE INVENTION

A system and method for a connection resource system are described.

According to a first embodiment of the invention, a method comprises establishing a first connection, the first connection being between one of one or more server applications and one of one or more external resources; and establishing a second connection, the second connection being between one of the one or more server applications and one of the one or more external resources; wherein the first connection and the second connection are established utilizing a single resource system Under a second embodiment of the invention, a server comprises one or more program object containers, each program object container containing a plurality of program objects; and a resource system to establish a plurality of connections, each connection being between one of one or more server applications and one of one or more external resources, each server application comprising a program object in one of the one or more program object containers.

Under a third embodiment of the invention, a resource system for a server comprises an interface with one or more program object containers; an interface with one or more connector services, each of the connector services providing a resource adapter for a resource of one or more resources; a connection manager to manage a plurality of connections, each connection being between a resource of the one or more resources and a server application of one or more server applications, each server application comprising a program object in a program object container of the one or more program object containers.

Under a fourth embodiment of the invention, a machine-readable medium having stored thereon data representing sequences of instructions that, when executed by a processor, cause the processor to perform operations comprising: receiving a request for first connection, the first connection involving a first program object and one of one or more external resources; obtaining a resource set from the first program object and storing the resource set; receiving a request for a second connection, the second connection involving a second program object and one of the one or more external resources; retrieving the resource set and determining whether the first connection and the second connection may share a resource; and establishing the second connection.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
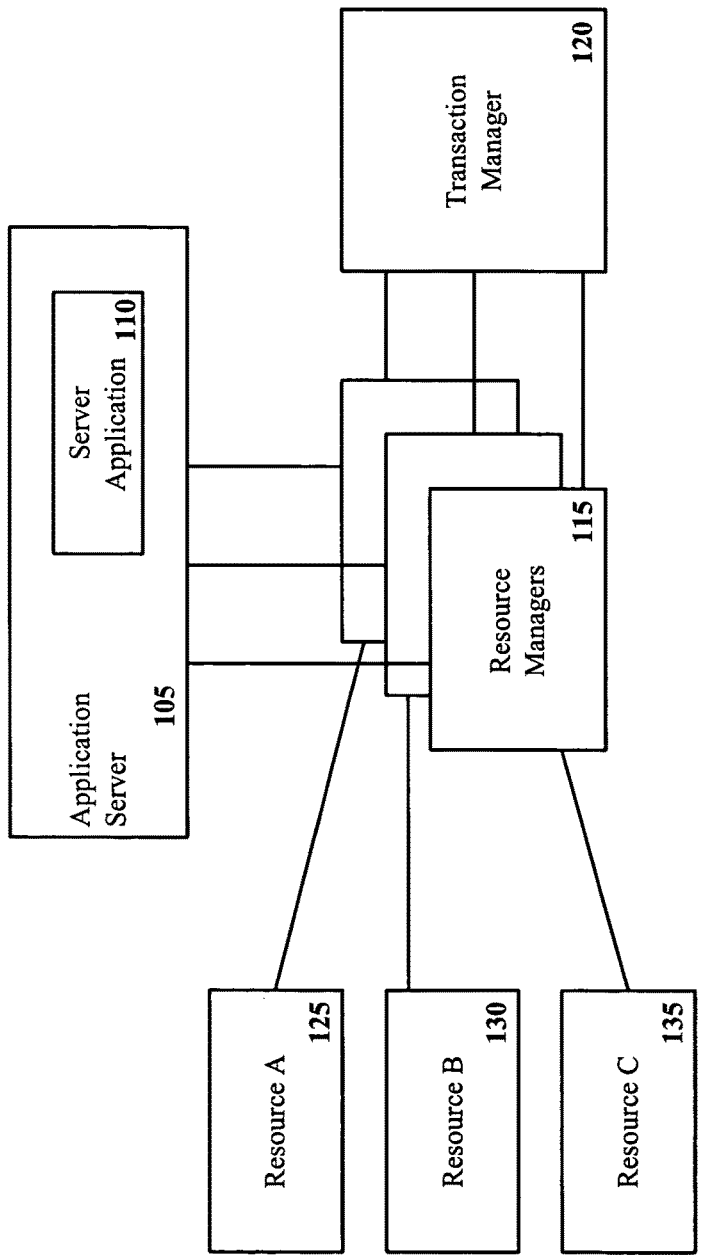
FIG. 1 is an illustration of an embodiment of a server utilizing multiple resource managers to provide connections.

Embodiments of the invention are generally directed to a system and method for a resource system for a server.

Under an embodiment of the invention, a resource system is provided for a server, the resource system providing a single system for multiple server transactions. Under an embodiment of the invention, the resource system may allocate resources among all containers of a server. Under an embodiment of the invention, the resource system provides for support in the establishment of communications contracts between multiple varying applications and/or multiple varying resource systems.

According to an embodiment of the invention, a resource system includes a connection manager for server transactions. Under an embodiment of the invention, the connection manager is utilized to obtain the resource set for each program object. In one embodiment, the connection manager obtains resource sets from the current active elements, the resource sets being used in the establishment of connections. Under an embodiment of the invention, each resource set is stored within a thread context by the context object of the resource set and is initiated from the container to which the active component belongs. In one embodiment, the resource set for each active component is stored. The resource set may be stored in relation to the relevant thread, such as in the thread context, for use in the establishment of connections and sharing of resources.

In server operations, a resource manager may be required for each connection between a container and an external resource. A transaction manager may provide the services and management functions required to support transactions.

In common server operations, each service that provides a resource manager has a separate relationship with the transaction manager. Under an embodiment of the invention, the resource manager is only required to have a relationship with a single resource system and the sole resource interface of the transaction manager is the interface with the resource system. The resource system has knowledge regarding each container and can span operations all of the containers. Under an embodiment of the invention, a resource system has a unified view of all connections for a server and provides services for all connections between arbitrary applications and arbitrary resources.

Under an embodiment of the invention, a resource system provides mechanisms for pooling connections, which may be referred to herein as managed connections. The resource system may also provide mechanisms for involvement with transactions (via a transaction service), for authentication (via security processes) ahead of the back end system of these connections, and for runtime information about connections and transactions in which the connections are involved. Under an embodiment of the invention, the resource system includes a connection manager for establishment and management of connections. According to an embodiment of the invention, a resource system utilizes a connection manager to store managed connections.

Under an embodiment of the invention, a resource system is utilized to fulfill the requirements of the J2EE Connector Architecture Specification (JCA), including version 1.0 Aug. 22, 2001 and 1.5, Nov. 24, 2003. Further, the Java Transaction API Specification (JTA), version 1.01B, Nov. 1, 2002, specifies certain Java interfaces between a transaction manager and the parties involved in a distributed transaction system.

FIG. 1 is an illustration of an embodiment of a server utilizing multiple resource managers to provide connections. In FIG. 1, an application server 110 includes a server application 110. In this illustration, there are three external resources that the server application 110 may utilize, these resources being illustrated as Resource A 125, Resource B 130, and Resource C 135. In FIG. 1, a resource manager 115 is provided for each connection between the application server 105 and an external resource. A transaction manager 120 is responsible for informing each resource manager regarding when to start and end work associated with a transaction and when to complete the transaction. Therefore, there is a separate relationship between the transaction manager and each of the resource managers.

Under an embodiment of the invention, a resource system may provide a specific contract between multiple containers on a server and connectors to resource services, such as enterprise information services (EIS). Under an embodiment of the invention, containers may include EJB (enterprise Java bean) and WEB containers. Under an embodiment of the invention, connectors include JDBC (Java Database Connectivity), JMS (Java message service) connectors, and JCA (Java connector architecture) services. The JDBC connector service provides for creation and deployment of JDBC adaptors. The JMS connector service provides for creation and deployment of adaptors to the JMS system. The JCA container service may provide for deploying arbitrary resource adaptors.

Figure 2:
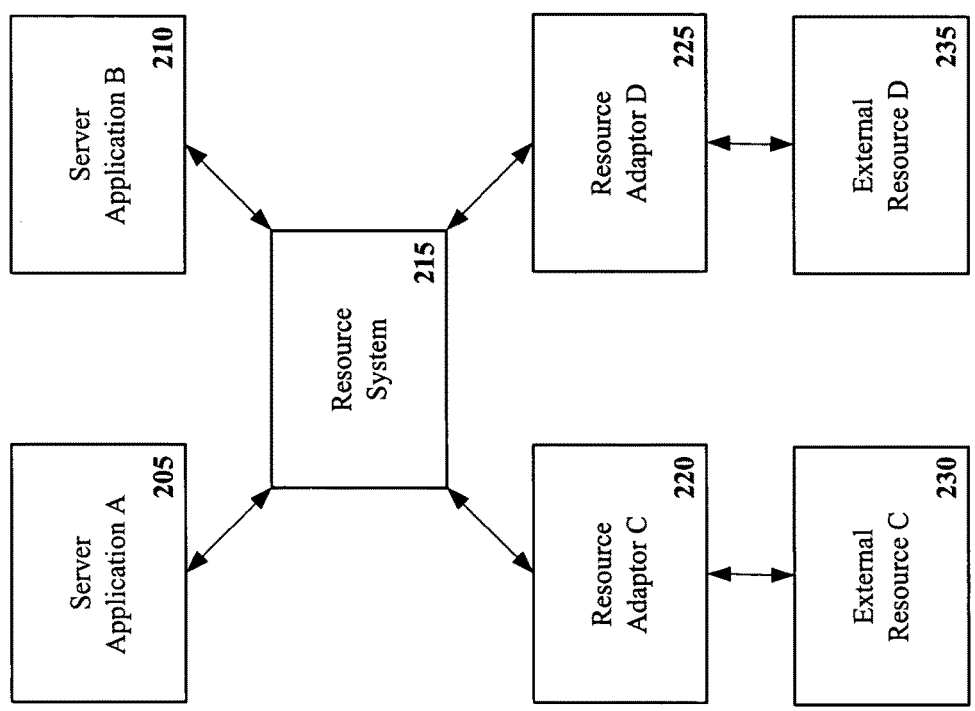
FIG. 2 is an illustration of an embodiment of a single resource system for a server.

FIG. 2 is an illustration of an embodiment of a single resource system for a server. In this illustration, a first server application, server application A 205, and a second server application, server application B 210, may establish connections with a first external resource, external resource C 230 connected by resource adaptor C 220, and a second external resource, external resource D 235 connected by resource adaptor D 225. However, instead of each application working separately with each external resource through a resource adaptor to establish and manage the communications contracts, the applications and resources utilize the resource system 215. Under an embodiment of the invention, the resource system 215 is present to assist in the establishment of connections between any server application and any external resource.

Figure 3:
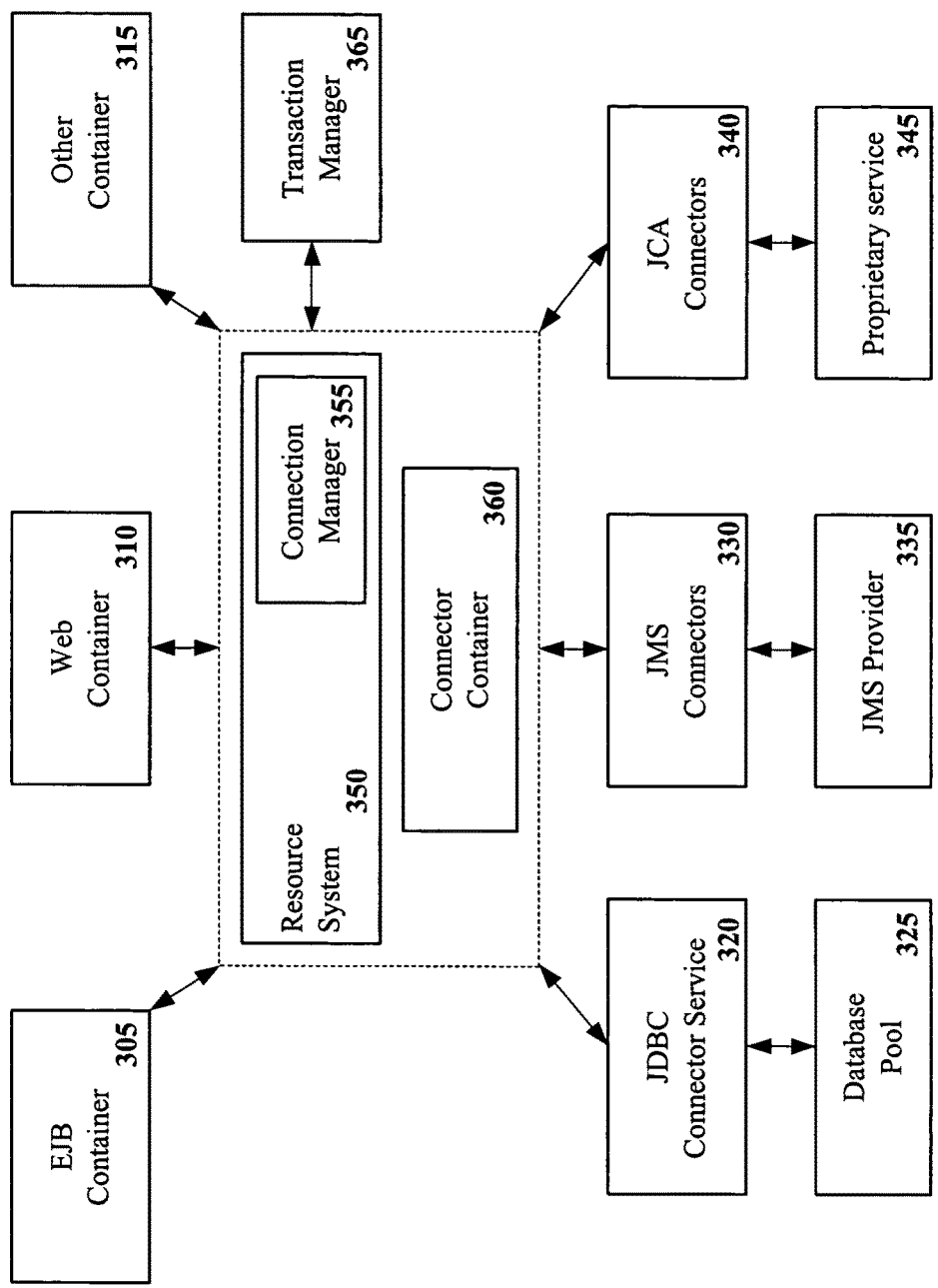
FIG. 3 is an illustration of an embodiment of a single resource system for a server connecting multiple containers and multiple resources.

FIG. 3 is an illustration of an embodiment of a single resource system for a server connecting multiple containers and multiple resources. In this illustration, there are present an enterprise Java bean (EJB) container 305, a web container 310, and another arbitrary container 315. For external resources, there is a database pool 325 that may be connected using a JDBC (Java database connection) connector service 320, a JMS (Java message service provider) 335 that may be connected utilizing JMS connectors 330, and a proprietary service 345 that may be connected using JCA (Java connector architecture) connectors 340. In this illustration, a single resource system 350 is utilized by all applications and external resources. The resource system 350 includes a connection manager 355, and utilizes a connection container 360 to store managed connections. A resource system maintains a relationship with a transaction manager 365 and therefore none of the containers is required to work separately with the transaction manager in order to enlist the connection into the current transaction.

Under an embodiment of the invention, the resource system utilizes resource sets of program objects in connection management. A resource set is a program object that keeps handle wrappers. Handle wrappers are the wrappers of all connection handles opened by an application component to both shared and unshared resources. The resource set also contains information about the application, the program component and the method that uses the resources, and the transactions (either global or local), in which the program component is used. In general terms, a wrapper is an object that encapsulates another object and delegates to the object in some way to alter its interface or behavior. A connection handle is an object tied to the underlying physical connection and could be used in a case when the underlying connection has to be shared. Each time an underlying connection has to be shared, a new handle to it is created.

Under an embodiment of the invention, each handle wrapper includes a reference to a managed connection event handler. The managed connection event handler is an object that wraps a managed connection and acts as a connection event listener from the underlying connection. The resource management system supports "lazy association" of a connection handle to a managed connection, which indicates that there is a lazy association of a handle wrapper to a managed connection event handler. The operation of "lazy association" is described in the J2EE Connector Architecture Specification (JCA).

Under an embodiment of the invention, a handle wrapper has three possible states:

(1) The handle wrapper is not associated with a managed connection event handler.

(2) A single handle wrapper is associated with a managed connection event handler. In such case, the connection is not shared.

(3) More than one handle wrapper is associated with a managed connection event handler, indicating that the managed connection is shared. Sharing is generally limited to JTA (Java transaction architecture) transactions.

When a resource set enters a transaction, all handle wrappers that it contains and all associated managed connections are enlisted in the transaction. Handle wrappers that are not associated with a managed connection event handler are ignored.

Under an embodiment of the invention, in the process of entering a resource set in a transaction, there are various possible situations, including:

(1) If a resource with local transaction support is not already enlisted in the transaction, a managed connection with local transaction support (local transactions being transactions that are generally started and coordinated by a resource manager internally) is enlisted using the transaction extension interface supported by the transaction service. The XAResources (an XAResource interface being a contract between a resource manager and a transaction manager) from the other managed connections are then enlisted in the usual fashion.

(2) If a resource with local transaction support is enlisted in the transaction, the system may not enlist a second one. In this instance, options that are possible include:

(a) If the resource set contains a handle wrapper with a reference to a managed connection with local transaction support and the managed connection is declared shareable, the system may attempt to associate a handle to the managed connection in the transaction. If the attempt falls or the managed connection is non-shareable, the system will throw an exception.

(b) If the resource set does not contain a managed connection with local transaction support, XAResources are enlisted in the usual fashion.

For resource sets, an exception may occur in a case in which more than one handle wrapper may point to different managed connections with local transaction support. In this case, an exception is thrown before the enlistment of any resources.

Under an embodiment of the invention, resources will be delisted when the resource set is dissociated from the transaction, which will happens when either the transaction is about to end or the component using the relevant resource set is dissociated from the transaction. Under an embodiment of the invention, when a delist all method is invoked on resources that support dissociation, the association of the connection handles to the managed connections ceases. If a managed connection is associated with XAResources, the system invokes an end over it and the managed connection is then returned to the connection pool. If the managed connection is associated with local transaction, the managed connection is returned to the pool after the transaction ends. Under an embodiment of the invention, if resources do not support dissociation, each handle wrapper is associated with a new managed connection. An attempt for resource dissociation may also occur after an invocation of a local transaction commit (indicating the point in a transaction when all updates to any resources involved in the transaction are made permanent) or rollback (indicating the point in a transaction when all updates to any databases involved in the transaction are reversed). Because of resource delistment, after a transaction ends, there are no longer any shared connections.

Under an embodiment of the invention, a resource system may address container-managed transactions. Container-managed transactions are transactions that are started by the EJB container of a server. The EJB container is the owner of such transactions and is therefore responsible for their completion as well. The container starts new transactions in accordance with the transaction attribute specified for the business methods of the enterprise beans.

Under an embodiment of the invention, when a component invokes a method to commence a transaction, UserTransaction.begin( ), this then leads to an invocation of a method to commence operation of the transaction manager, TransactionManage.begin( ). The method will throw an exception if there is already a running transaction in the thread. Otherwise, the method takes the resource set from the thread context. The resource set in this case is equivalent to the resource set of the component that has invoked the method of begin the transaction. The resources from the resource set are thereby enlisted in the new transaction. The transaction is completed or ended by a UserTransaction.commit( ) or UserTransaction.rollback ( ) invocation. Under an embodiment of the invention, this leads to resource delisting and a call of the TransactionManager.committ( ) or 'TransactionManager.rollback ( ) methods respectively.

Under an embodiment of the invention, the context of an enterprise bean keeps a resource set object that holds references to the resources opened by the bean. This resource set is enlisted in the transaction. The session and the message-driven beans may invoke the UserTransaction.begin ( ) method in addition to participating in container-managed JTA transactions.

Under an embodiment of the invention, unlike enterprise beans, the resources used for each servlet request are stored in a resource set in the thread, within which the request is processed. The connections opened during the execution of the servlet's init( ) method, are kept in the relevant resource set. After the method returns, the resource set is cleared. If the servlet does not close the opened connections, it can still use them afterwards, but they cannot be enlisted in a global transaction, and thus this would be is considered an application fault. Under an embodiment of the invention, a servlet explicitly closes the open connections and completes the local transactions.

Under an embodiment of the invention, the process of opening and closing connections may vary depending on whether the connection is within a transaction, such as follows:

(1) Opening a connection within a transaction—In this case, if any resource is declared shareable, the system attempts to share any managed connection. If a resource is unshareable, the behavior of the system depends on whether it supports XAResources or local transactions. For XAResource support, a new connection is created and the XAResource is enlisted. For local transaction support, if the local transaction is already enlisted in the global transaction, the system will throw an exception. If not, the local transaction is enlisted.

(2) Closing a connection within a transaction—If a connection handle is shared, it is then closed and deleted from the list. If the connection handle is not shared and the underlying managed connection supports XAResource, the XAResource is delisted, and the managed connection is returned to the pool. If a connection handle is not shared and has local transaction support, it is closed but the managed connection is returned to the pool only after the end of the transaction.

(3) Opening a connection outside of a transaction—A managed connection is retrieved from the pool and a managed connection event handler is created. The resource system creates the connection handle and the handle wrapper and adds this to the resource set.

(4) Closing a connection outside of a transaction—The managed connection, with which the connection is associated only if the managed connection does not support dissociation, is returned to the pool, and the handle wrapper is destroyed.

Under an embodiment of the invention, resources may not be shared in certain circumstances, such as when the transaction support type of the resource adapter is NoTransaction; the resource is used in a system thread; the resource reference is declared non-transactional; or when the resource sharing scope is Unshareable. Generally resources are shared only in JTA (Java transaction architecture) transactions.

Figure 4:
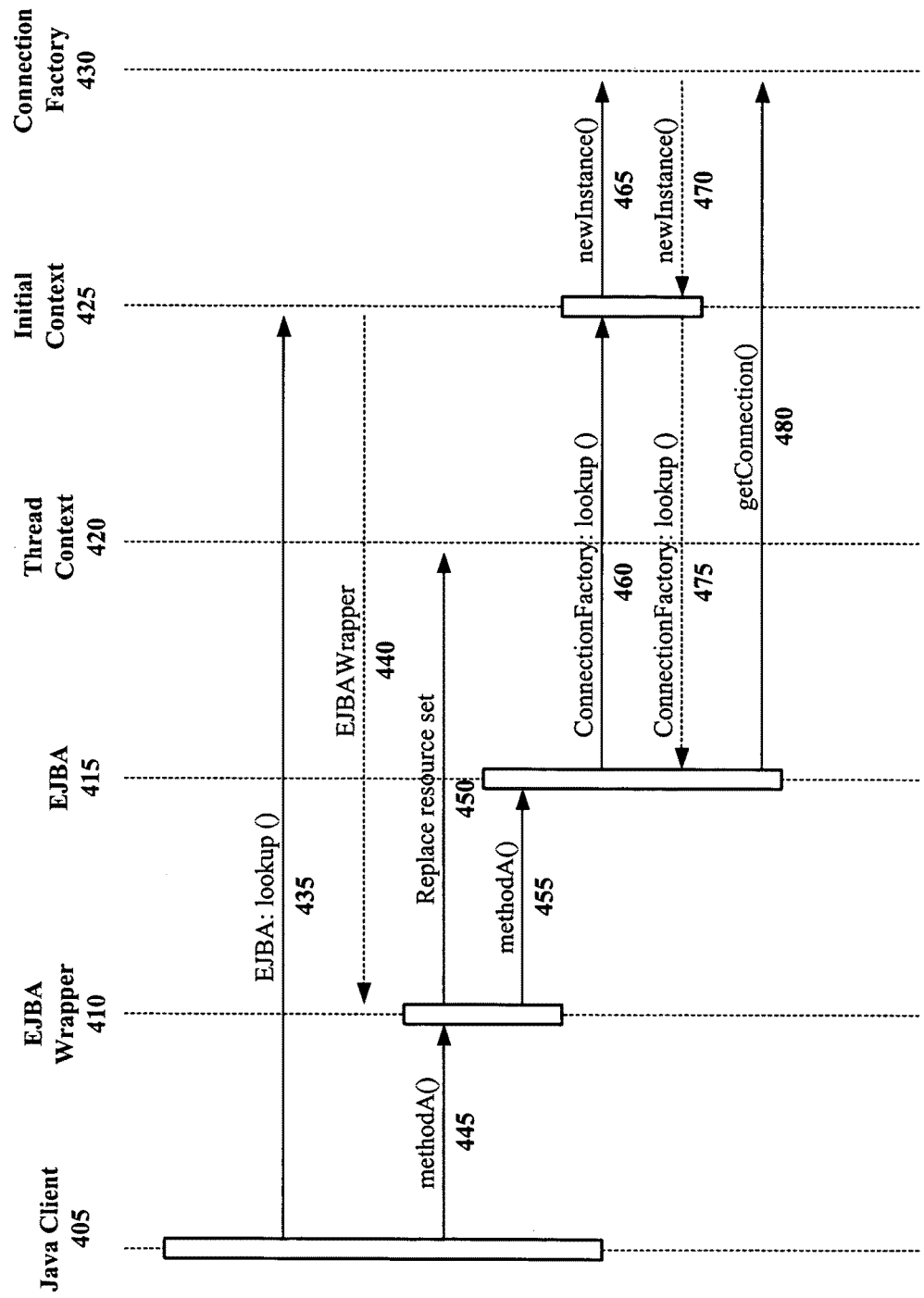
FIG. 4 illustrates processes for an embodiment of an initiation of a connection.

FIG. 4 illustrates processes for an embodiment of an initiation of a connection. In this illustration, a Java client 405 requests a lookup for an enterprise java bean, EJBA 415. The initial context 420 returns the EJBA wrapper 440. The Java client 405 then calls a method 445 to the EJBA wrapper 410. The resource set contained in the thread context is then replaced 450 with resource set of the EJBA 415. The method methodA( ) 455 then is forwarded to the EJBA 415. In response, the EJBA 415 requests a lookup of a connection factory 460 (a factory being an object to generate connections) from the initial context 425. A new instance 465 of the connection factory 430 is created. Following the returns of the new instance 470 and the connection factory lookup 475, there is a request to get the new connection from the EJBA 415 to the connection factory 430.

Figure 5:
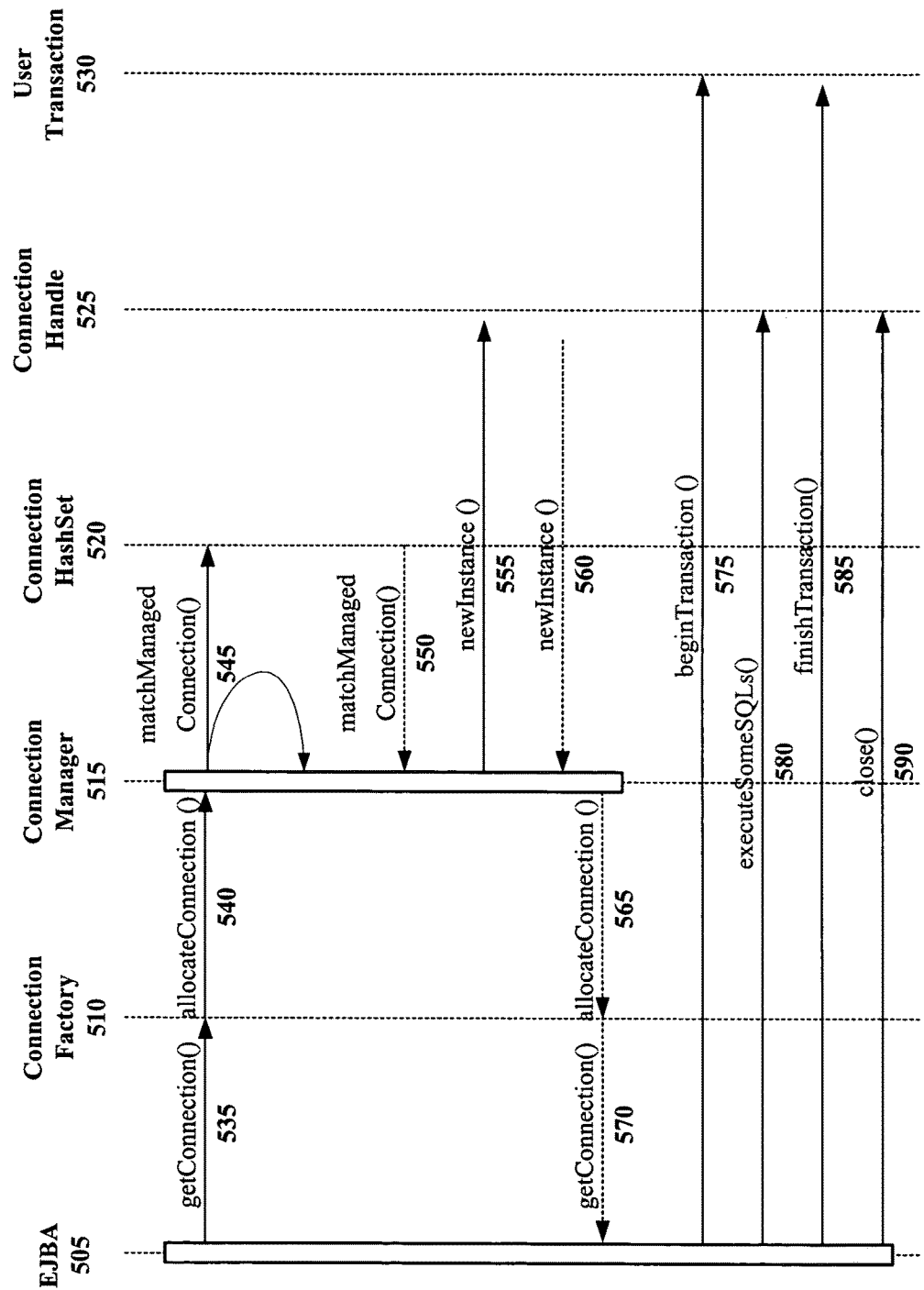
FIG. 5 illustrates processes for an embodiment of a connection request.

FIG. 5 then illustrates processes for an embodiment of a connection request. FIG. 5 begins with the request to get a connection 535 from an enterprise Java bean EJBA 505 to the connection factory 510. The connection factory 510 then follows with a request to the connection manager 515 (which is part of a resource system under an embodiment of the invention) to allocate the connection 540. The connection manager 515 then provides a request to match a managed connection 545 by using a connection hash set 520, with the latter case resulting in the matched managed connection return 550. The connection manager then follows by requesting a new instance 555 of a connection handle 525. This is followed by the returns for the new instance request 560, the allocation of the connection 565 and the get connection request 570.

With the new connection in place, the process of the transaction may follow, shown in FIG. 5 by a request to begin 575 the user transaction 530, the execution of some SQLs (structured query language statements) 580, a request to finish 585 the user transaction 530, and a request to close 590 the connection handle 525.

Figure 6:
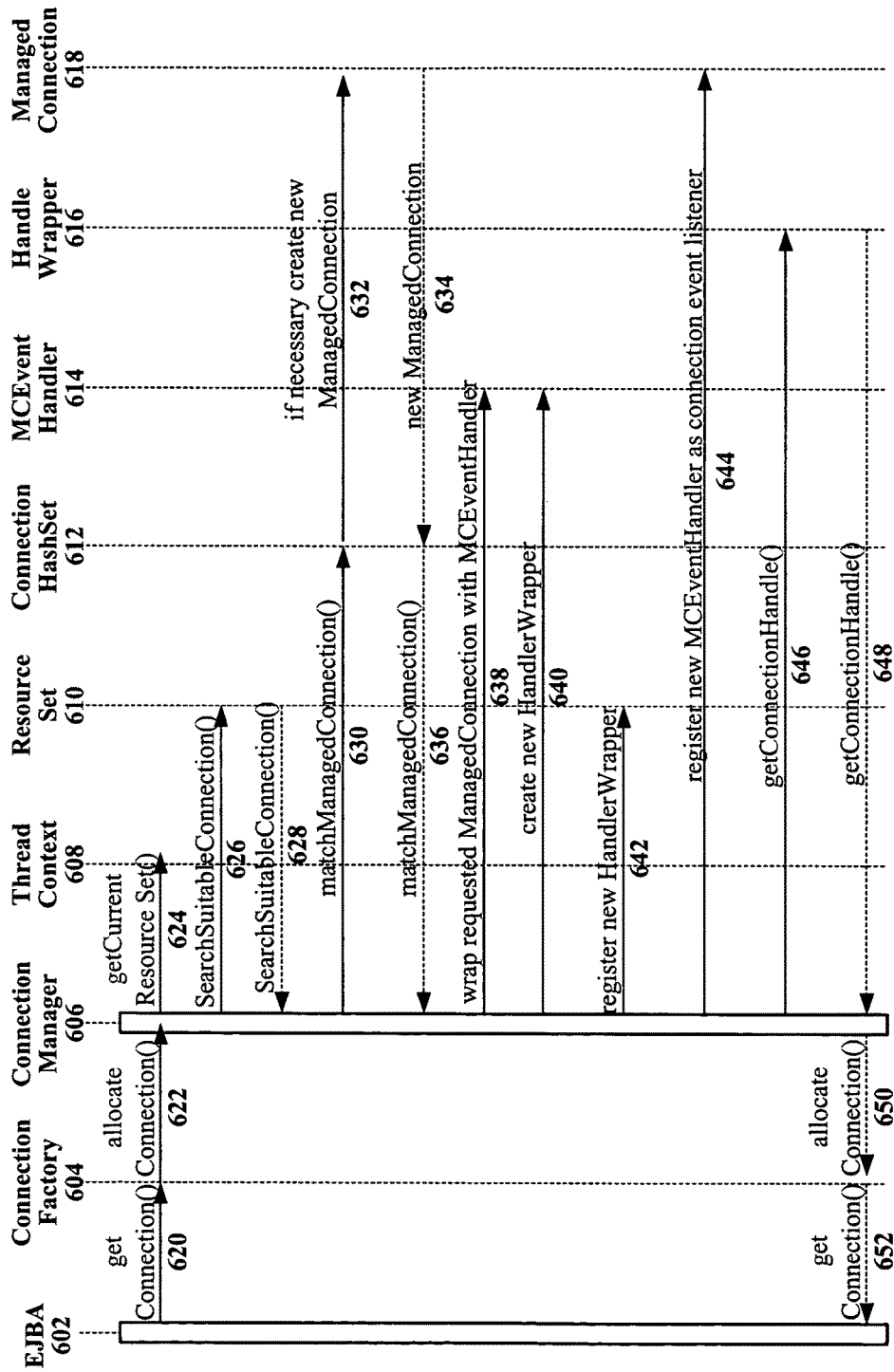
FIG. 6 illustrates processes for an embodiment of a connection operation.

FIG. 6 then illustrates processes for an embodiment of a connection operation. In this illustration, there is a request to get a new connection 620 from an enterprise Java bean EJBA 602 to a connection factory 604, followed by an allocate connection request 622 to the connection manager 606. There is a request to obtain the current resource set 624 from the thread context 608, which will indicate the current resources. The connection manager utilizes the resource set 610 to search for a suitable connection 626, with the return shown 628. The connection manager then matches a managed connection 630, possibly utilizing a connection hash set 612. If necessary, when no existing managed connection is usable, a new managed connection is created 632, the managed connection being illustrated as 618. The returns for the new managed connection creation 634 and match of managed connection 636 are followed by the connection manager 606 wrapping the requested managed connection with a managed connection event handler 638, the event handler being shown as 614. The connection manager creates a new handler wrapper 640 and registers the handler wrapper 642 with the resource set 610. The managed connection event handler is then registered as a connection event listener 644. The connection manager gets the connection handle 646, with the process being completed by the returns for getting the connection handle 648, allocating the connection 650, and getting the connection 652.

Figure 7:
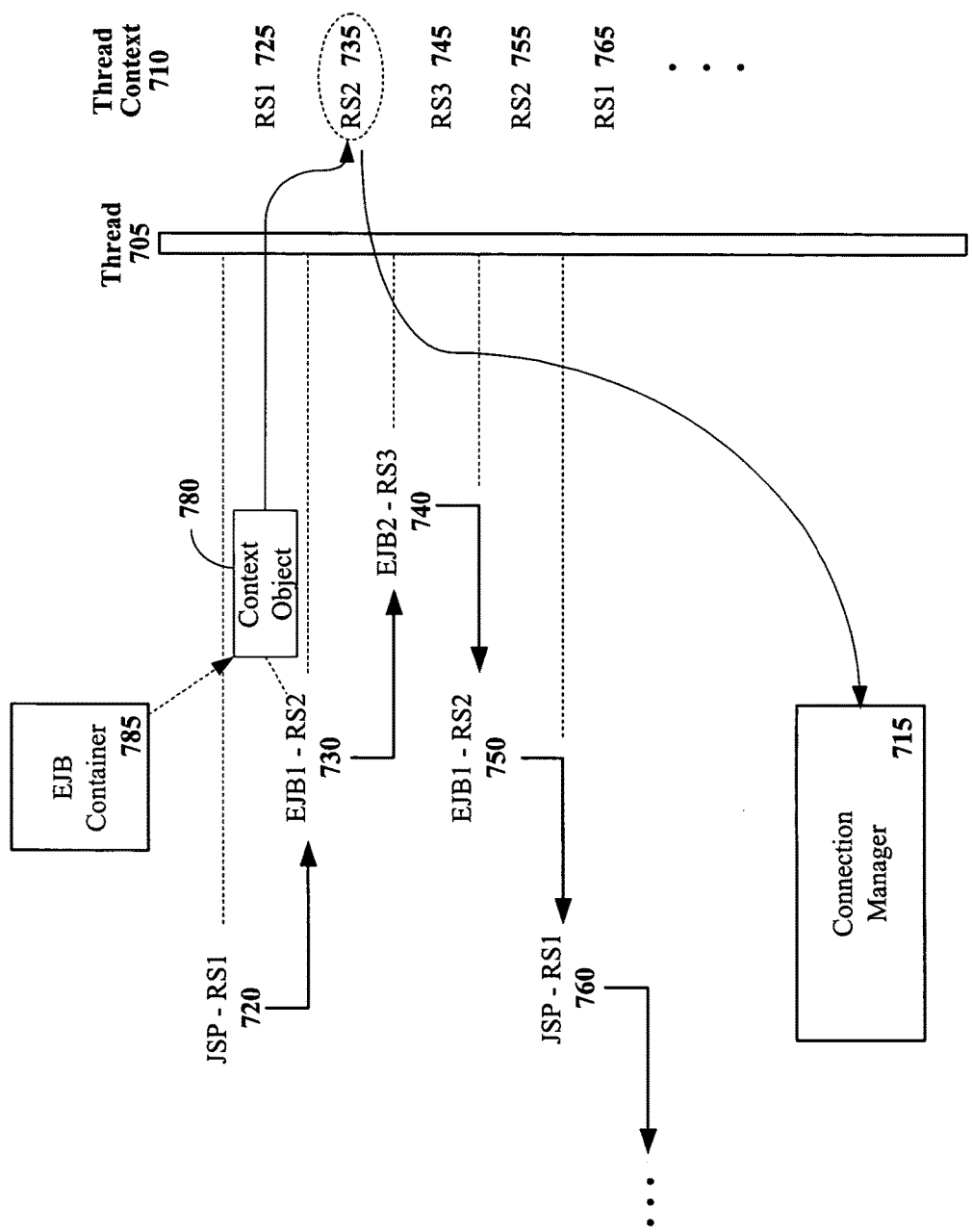
FIG. 7 illustrates an embodiment of operations of a connection manager with regard to resource sets.

FIG. 7 illustrates an embodiment of operations of a connection manager with regard to resource sets. This illustration follows a certain program thread, a thread being the basic unit of Java program execution. In this illustration, the program thread 705 includes a thread context 710, with resource sets being stored in the thread context. Each resource set for an active component is stored by the context object of the resource set, as initiated by the container to which the active component belongs. A connection manager 715 obtains the resource sets of active program objects and utilizes these in connection processes. In this illustration, Java server page (JSP) 720 contains a first resource set (RS1) for this particular request and this resource set RS1 is initially stored 725. The next active element is a first enterprise Java bean EJB1 730 with a second resource set (RS2) 735. The resource set RS2 is stored by the context object 780 of resource set RS2, as initiated by the EJB container 785, which is then the container of the active component.

As shown in FIG. 7, when there is a connection call with regard to the activation of a second enterprise Java bean (EJB2) 740, the connection manager 715 obtains the resource set RS2 735 from the prior active element in the thread context 710. When EJB2 740 is addressed, the resource set for the prior active element, this being resource set RS2 735, is present in the thread context 710 and is utilized in the determination of existing resources in the establishment of a connection for the new active component. This process continues with the storage of the resource set RS3 745 from EJB2 740, the resource set RS2 755 from EJB2 750, and the resource set RS1 765 from JSP 760.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
storing one or more instructions on a machine-readable medium, the one or more instructions configuring one or more processors of a system to perform operations, the operations including:
receiving a request to establish a connection to a first external resource of a plurality of external resources, the request to establish the connection to the first external resource being from a first server application of a plurality of server applications, the first server application comprising a first program object, the first program object residing in a first server container of a plurality of server containers; and
receiving a request to establish a second connection to a second external resource of the plurality of external resources, the request to establish the connection to the second external resource being from a second server application of the plurality of server applications, the second server application comprising a second program object, the second program object residing in a second server container of the plurality of server containers,
wherein the request to establish the connection to the first external resource and the request to establish the connection to the second external resource are handled utilizing a resource system that maintains a relationship with a transaction manager such that the first server container is not required to work separately with the transaction manager in order to enlist the connection to the first external resource into a first transaction and the second server container is not required to work separately with the transaction manager to enlist the connection to the second external resource into a second transaction, wherein the resource system is used to fulfill requirements of the J2EE Connector Architecture (JCA) specification, the maintaining of the relationship including associating a handle wrapper with the connection to the first external resource, the handle wrapper including a reference to an object that wraps the connection to the first external resource, the first handle wrapper having one of three states, the three states including a first state, a second state, and a third state, the first state specifying that the handle wrapper is not associated with a managed connection, the second state specifying that the handle wrapper is associated with a managed connection that is not shared, and the third state specifying that the handle wrapper is associated with a managed connection that is shared with an additional handle wrapper associated with the managed connection, the third state limited to Java Transaction Architecture (JTA) transactions, the maintaining of the relationship also including associating a further handle wrapper with the connection to the second external resource, the further handle wrapper also having one of the first state, the second state, and the third state with respect to the further handle wrapper.

2. The method of claim 1, wherein the single resource system includes a connection manager configured to:
obtain a first resource set from the first program object;
obtain a second resource set from the second program object;
store the first resource set in relation to a thread; and
store the second resource set in relation to the thread.

3. The method of claim 1, further comprising storing a first resource set in the context of an active program thread, the first resource set corresponding to the first program object and including the managed connection.

4. The method of claim 3, wherein the first resource set includes data regarding resources used by the first program object.

5. The method of claim 1, further comprising obtaining a first resource set from an active element in a thread context corresponding to the first program object.

6. The method of claim 1, wherein the handling comprises determining whether the second connection may share the first external resource with the first connection.

7. The method of claim 1, wherein the first server container is an enterprise java bean (EJB) container.

8. The method of claim 1, wherein the second server container is a web container.

9. The method of claim 1, wherein the first connection and the second connection are in compliance with the Java 2 platform enterprise edition (J2EE) connector architecture (JCA) specification.

10. The method of claim 1, wherein the plurality of external resources comprise a plurality of enterprise information systems (EIS).

11. A server comprising:
a processor-implemented single resource system configured to, at least:
receive a request to establish a connection to a first external resource of a plurality of external resources, the request to establish the connection to the first external resource being from a first server application of a plurality of server applications, the first server application including a first program object in a first program object container;
receive a request to establish a connection to a second external resource of the plurality of external resources, the request to establish the connection to the second external resource being from a second server application of the plurality of server applications, the second server application including a second program object in a second program object container; and
maintain a relationship with a transaction manager such that the first program object container is not required to work separately with the transaction manager to enlist the connection to the first external resource into a first transaction and the second program object container is not required to work separately with the transaction manager to enlist the connection to the second external resource into a second transaction, wherein the resource system is used to fulfill requirements of the J2EE Connector Architecture (JCA) specification, the maintaining of the relationship including associating a handle wrapper with the connection to the first external resource, the handle wrapper including a reference to an object that wraps the connection to the first external resource, the first handle wrapper having one of three states, the three states including a first state, a second state, and a third state, the first state specifying that the handle wrapper is not associated with a managed connection, the second state specifying that the handle wrapper is associated with a managed connection that is not shared, and the third state specifying that the handle wrapper is associated with a managed connection that is shared with an additional handle wrapper associated with the managed connection, the third state limited to Java Transaction Architecture (JTA) transactions, the maintaining of the relationship also including associating a further handle wrapper with the connection to the second external resource, the further handle wrapper also having one of the first state, the second state, and the third state with respect to the further handle wrapper.

12. The server of claim 11, wherein the single resource system is further configured to interface with a plurality of connector services that provide a plurality of resource adapters corresponding to the plurality of external resources.

13. The server of claim 12, wherein each of the plurality of external resources comprises an external information system.

14. The server of claim 11, wherein the single resource system is configured to observe the operation of the connection to the first external resource and the connection to the second external resource.

15. The server of claim 11, wherein the single resource system is configured to obtain a first resource set from the first program object and a second resource set from the second program object.

16. The server of claim 15, wherein each resource set is to be saved in the context for an active program thread.

17. The server of claim 15, wherein the single resource system is configured to utilize the saved first resource set to establish the connection to the second external resource.

18. A non-transitory computer-readable medium having stored thereon data representing sequences of instructions executable by a processor to cause the processor to perform operations comprising:
receiving a request to establish a connection to a first external resource of a plurality of external resources, the request to establish the connection to the first external resource being from a first server application of a plurality of server applications, the first server application comprising a first program object, the first program object residing in a first server container of a plurality of server containers;
obtaining a resource set from the first program object and storing the resource set, the resource set including a handle wrapper that includes a reference to an object that wraps a connection created to handle the request to establish the connection to the first external resource, the handle wrapper having one three states, the three states including a first state, a second state, and a third state, the first state specifying that the handle wrapper is not associated with a managed connection, the second state specifying that the handle wrapper is associated with a managed connection that is not shared, and the third state specifying that the handle wrapper is associated with a managed connection that is shared with an additional handle wrapper associated with the managed connection, the third state limited to Java Transaction Architecture (JTA) transaction, the third state limited to Java Transaction Architecture (JTA) transactions;
receiving a request to establish a connection to a second external resource of the plurality of external resources, the request to establish the connection to the second external resource being from a second server application of the plurality of server applications, the second server application comprising a second program, the second program object residing in a second container of the plurality of server containers; and
retrieving the resource set and determining whether to handle the request to establish the second connection to the second external resource by sharing the connection;
wherein the request to establish the connection to the first external resource and the request to establish the connection to the second external resource are handled utilizing a single resource system, the single resource system maintaining a relationship with a transaction manager such that the first server container is not required to work separately with the transaction manager in order to enlist the connection to the first external resource into a first transaction and the second server container is not required to work separately with the transaction manager in order to enlist the connection to the second external resource into a second transaction, wherein the resource system is used to fulfill requirements of the J2EE Connector Architecture (JCA) specification.

19. The non-transitory computer-readable medium of claim 18, wherein the resource set includes data regarding resources used by the first program object.

20. The non-transitory computer-readable medium of claim 18, wherein the storing the resource set comprises storing the resource set in a context of an active program thread.

21. The non-transitory computer-readable medium of claim 18, wherein the connection to the first external resource and the connection to the second external resource are in compliance with the Java 2 platform enterprise edition (J2EE) connector architecture (JCA) specification.

22. The non-transitory computer-readable medium of claim 18, wherein the connection to the first external resource and the connection to the second external resource are made using connectors from a connector container.

* * * * *